US009136697B2

(12) United States Patent
Werner et al.

(10) Patent No.: US 9,136,697 B2
(45) Date of Patent: Sep. 15, 2015

(54) SUBSTATION AUTOMATION SYSTEM WITH PROTECTION FUNCTIONS

(75) Inventors: Thomas Werner, Baden (CH); Jean-Charles Tournier, Bellegarde sur Valserine (FR)

(73) Assignee: ABB RESEARCH LTD, Zurich (CH)

( * ) Notice: Subject to any disclaimer, the term of this patent is extended or adjusted under 35 U.S.C. 154(b) by 807 days.

(21) Appl. No.: 13/345,203

(22) Filed: Jan. 6, 2012

(65) Prior Publication Data
US 2012/0123603 A1 May 17, 2012

Related U.S. Application Data

(63) Continuation of application No. PCT/EP2010/057325, filed on May 27, 2010.

(30) Foreign Application Priority Data

Jul. 7, 2009 (EP) ..................................... 09164725

(51) Int. Cl.
*G05D 3/12* (2006.01)
*H02H 7/26* (2006.01)
*H02H 1/00* (2006.01)

(52) U.S. Cl.
CPC ............. *H02H 7/261* (2013.01); *H02H 1/0061* (2013.01); *Y02E 60/723* (2013.01); *Y04S 10/16* (2013.01)

(58) Field of Classification Search
CPC ...... H02H 7/261; H02H 1/0061; Y04S 10/16; Y02E 60/723
USPC ................................................. 700/291–294
See application file for complete search history.

(56) References Cited

U.S. PATENT DOCUMENTS 4,728,948 A * 3/1988 Fields .......................... 340/3.71
6,970,771 B1 * 11/2005 Preiss et al. ................... 700/286
8,156,061 B2 * 4/2012 Vetter et al. ..................... 706/45
(Continued)

FOREIGN PATENT DOCUMENTS

EP          1 976 177 A1    10/2008
WO    WO 2008/040263 A1     4/2008
WO    WO 2009/010084 A1     1/2009

OTHER PUBLICATIONS

Apostolov-A., "Object Models of Protection Devices in IEC 61850", IEEE, 2005, pp. 915-920.*

(Continued)

*Primary Examiner* — Robert Fennema
*Assistant Examiner* — Thomas Stevens
(74) *Attorney, Agent, or Firm* — Buchanan Ingersoll & Rooney PC

(57) ABSTRACT

A Substation Automation (SA) system is configured to perform protection functions for a bay of an electrical power distribution substation, receive, via a communication link, redundancy protection commands from a remote center, and execute the redundancy protection commands for the bay. The SA system is configured to transmit to a redundant protection server of the remote center, process values measured by measurement equipment of the substation, and to receive, from the redundant protection server, and forward, via the process bus, the received redundancy protection commands directed to operating equipment of the substation. Thus, for multiple SA systems, redundant protection functions are implemented and provided cost-efficiently by one common remote central unit.

9 Claims, 2 Drawing Sheets

(56) References Cited

U.S. PATENT DOCUMENTS

| | | | |
|---|---|---|---|
| 8,804,547 B2* | 8/2014 | Wimmer | 370/252 |
| 2002/0059477 A1* | 5/2002 | Wimmer et al. | 710/1 |
| 2004/0027750 A1* | 2/2004 | Minami et al. | 361/62 |
| 2005/0043861 A1* | 2/2005 | Thompson | 700/292 |
| 2007/0238164 A1* | 10/2007 | Kim | 435/287.2 |
| 2008/0234872 A1* | 9/2008 | Vetter et al. | 700/286 |
| 2008/0244044 A1 | 10/2008 | Wimmer | |
| 2010/0002879 A1* | 1/2010 | Risley | 380/255 |

OTHER PUBLICATIONS

Zhang et al., "A New-Style Centralized IED based on IEC 61850", IEEE, 2008, pp. 1-5.*

International Search Report (PCT/ISA/210) issued on Sep. 17, 2010, by European Patent Office as the International Searching Authority for International Application No. PCT/EP2010/057325, 2 pages.

International Preliminary Report on Patentability (PCT/IPEA/409) issued on Nov. 2, 2011, by European Patent Office as the International Searching Authority for International Application No. PCT/EP2010/057325, 8 pages.

International Electrotechnical Commission, Technical Committee 57: Power Systems Management and Associated information Exchange, Draft IEC TR 61850-90-1: Communication Networks and Systems for Power Utility Automation—Part 90-1: Use of IEC 61850 for the Communication between Substations, 57/924/DC, (2008), pp. 1-80.

* cited by examiner

SUBSTATION AUTOMATION SYSTEM WITH PROTECTION FUNCTIONS

RELATED APPLICATION

This application claims priority as a continuation application under 35 U.S.C. §120 to PCT/EP 2010/057325, which was filed as an International Application on May 27, 2010 designating the U.S., and which claims priority to European Application 09164725.5 filed in Europe on Jul. 7, 2009. The entire contents of these applications are hereby incorporated by reference in their entireties.

FIELD

The present disclosure relates to a Substation Automation (SA) system for an electrical power distribution. More particularly, the present disclosure relates to an SA system configured to perform protection functions for a bay of an electrical power distribution substation, such as a medium-voltage substation, for example.

BACKGROUND INFORMATION

In an electric power system, for example, in high and medium-voltage power networks, substations include primary devices such as electrical cables, lines, bus bars, switches, power transformers and instrument transformers, which are generally arranged in switch yards and/or bays. These primary devices are operated in an automated way via an SA system. The SA system includes secondary devices, including Intelligent Electronic Devices (IEDs), which are responsible for the protection, control and monitoring of the primary devices. IEDs for SA or process control are embedded devices configured to execute protection functions for the primary equipment. To provide for failing protection functions, in high-voltage power networks, redundant protection is implemented locally, that is, inside the substation.

According to EP-A 1976177, in SA systems, the mean time to repair is reduced by means of remote re-configuration and start-up of a replacement or spare IED, leaving some more hours for the maintenance personnel to repair an inactive or faulty IED. The time required for the actual repair is irrelevant for the system availability as long as it is short enough compared to the IED failure rate. Therefore, the remote configured spare IED leads to nearly the same availability as a hot, standby configuration, but without the need for doubling all the essential IEDs, since only one spare online IED is needed for each set of IEDs of the same type connected to the same station bus and process bus.

Nevertheless, in the context of medium-voltage substations, protection functions for the primary equipment are usually not redundant. The main reason for avoiding redundancy is cost efficiency. Indeed, the known manner to provide protection function redundancy (such as in high voltage substations) requires duplication of the hardware devices, such as IEDs, which execute the protection functions. From a cost point of view, such an approach almost doubles the price of the protection part of the SA system, because of the redundant hardware as well as the engineering part spent on setting up the redundant system.

SUMMARY

An exemplary embodiment of the present disclosure provides a remote redundancy facility which includes a protection server for a plurality of Substation Automation (SA) systems. Each of the SA systems is configured to respectively perform protection functions for corresponding bays of a substation of an electric power distribution system. The remote redundancy facility is remote from the SA systems. The protection server is configured to run redundant protection functions and to transmit, via communication links to the Substation Automation systems, redundancy protection commands to be executed by the respective SA systems for the corresponding bays, respectively.

An exemplary embodiment of the present disclosure provides a Substation Automation (SA) system which is configured to perform protection functions for a bay of a substation of an electric power system, receive via a communication link redundancy protection commands from the above-described remote redundancy facility, and to execute the redundancy protection commands for the bay.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
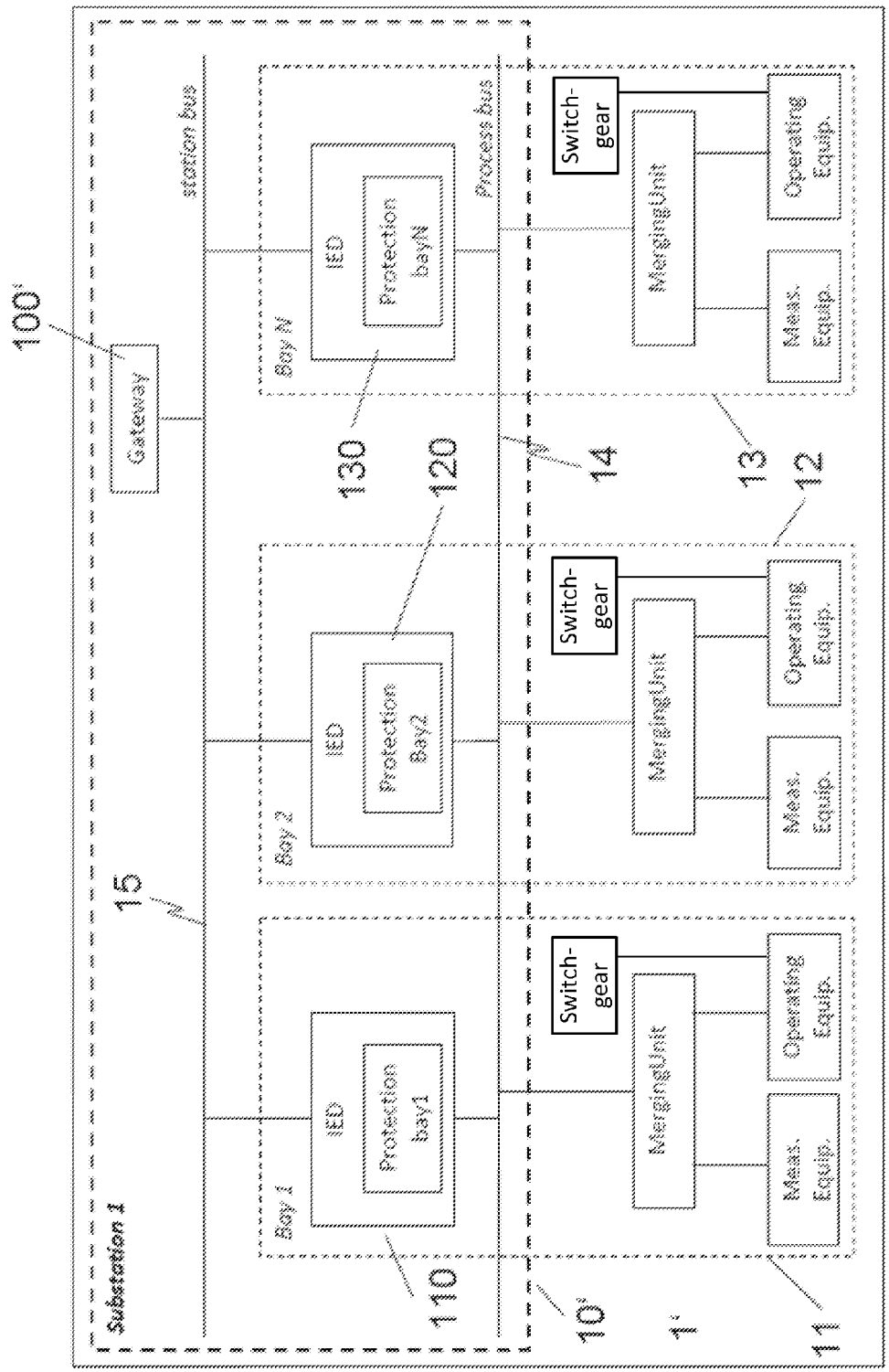
FIG. 1 shows a block diagram illustrating schematically an electrical power distribution substation with an SA system configured to perform protection functions without any redundancy for bays of the substation.

Exemplary embodiments of the present disclosure provide an SA system which performs protection functions for a bay of an electrical power distribution substation, for example a medium-voltage substation, without at least some of the disadvantages of known techniques. For instance, exemplary embodiments of the present disclosure provide an SA system which provides for failing protection functions, without the costs associated with duplication of the hardware devices which execute the protection functions.

Exemplary embodiments of the present disclosure provide an SA system configured to perform protection functions for a bay of a substation of an electric power system, such as a medium-voltage substation, for example. Exemplary embodiments of the present disclosure also provide a remote redundancy facility having a computerized protection server for one or more of a plurality of SA systems, where each of the SA systems performs protection functions for bays of a substation of an electric power distribution system, such as a medium-voltage substation, for example.

In accordance with an exemplary embodiment of the present disclosure, an SA system is configured to perform protection functions for a bay of an electrical power distribution substation, for example, a medium-voltage substation. The exemplary SA system is further configured to receive, via a communication link, redundancy protection commands from a remote center, and to execute the redundancy protection commands for the bay. Thus, for the protection functions of multiple SA systems, redundant protection functions are implemented and provided remotely (off-site) in and by one common central unit. For example, instead of doubling the number of IEDs inside a substation, the cost of the redundant protection server can be shared among several substations.

Consequently, the cost associated with the hardware platform for implementing protection redundancy is shared among several substations, while the engineering phase is minimal. Hence, redundancy is obtained at low cost by grouping the redundant protection functions of several substations into a single common location.

In accordance with an exemplary embodiment, the SA system includes a protection module, for example, an IED, which is configured to perform the protection functions and is connected via a process bus to measurement equipment and/or sensors and/or to operating equipment and/or actuators associated with the bay. For example, the protection module (e.g., IED) can be connected to a gateway via a substation communication network. Moreover, in accordance with an exemplary embodiment, the SA system is configured to transmit, from the process bus to the remote center, process values measured by the measurement equipment, and to receive, from the remote center, and forward via the process bus redundancy protection commands directed to the operating equipment.

In accordance with an exemplary embodiment, the SA system can also include a gateway for communicating with the remote center. The gateway is connected to the process bus and is configured to forward to the remote center network messages which include the process values from the measurement equipment, and to forward to the operating equipment redundancy protection commands included in network messages received from the remote center. For example, the gateway can be connected to the measurement equipment and/or operating equipment via a redundant communication network.

Exemplary embodiments of the present disclosure also provide a computerized protection server for one or more SA systems which in each case perform protection functions on behalf of a bay of an electrical power distribution substation, for example, a medium-voltage substation. In accordance with an exemplary embodiment, the protection server is located remote from the one or more SA systems and is configured to transmit, via a communication link to the one or more SA systems, redundancy protection commands to be executed by the respective SA system for the bay. In accordance with an exemplary embodiment, the protection server includes a plurality of redundant protection modules. Each redundant protection module is associated with a specific bay of a substation, and is configured to receive process values measured by the measurement equipment associated with that specific bay, and to transmit redundancy protection commands to the operating equipment associated with that specific bay. For example, the protection server can be part of a Network Control Center associated with the electrical power distribution network.

In FIG. 1, reference numeral 1' refers to a substation of an electric power system, for example, a medium voltage substation of an electric power distribution system. The substation 1' includes a known Substation Automation system 10'. The SA system 10' includes protection modules 110, 120, 130, for example, IEDs, which are configured in each case to perform protection functions for a respective bay 11, 12, 13 of the substation 1'. As illustrated in FIG. 1, the protection modules 110, 120, 130 are connected via a process bus 14 and, by way of merging units, to operating equipment and/or measurement (meas.) equipment, for example, through current and/or voltage transformers (CT/VT). In accordance with an exemplary embodiment, the internal communication of the substation 1' can be implemented as defined in IEC61850 for medium-voltage substations, for example, according to section 5 of IEC61850 which defines the communication that take place inside a substation (e.g., GOOSE or Sample Values). The substation 1' further includes a gateway 100' for external communication, for example, to a Network Control Center associated with the electrical power distribution network. The gateway 100' provides for protocol conversion between the substation 1' and the Network Control Center. The protection modules 110, 120, 130 are connected to the gateway 100' via a station bus 15. The substation 1' or SA system 10', respectively, does not have any redundancy. In known techniques, a redundancy scheme would include additional (redundant) IEDs with redundant protection functions.

Figure 2:
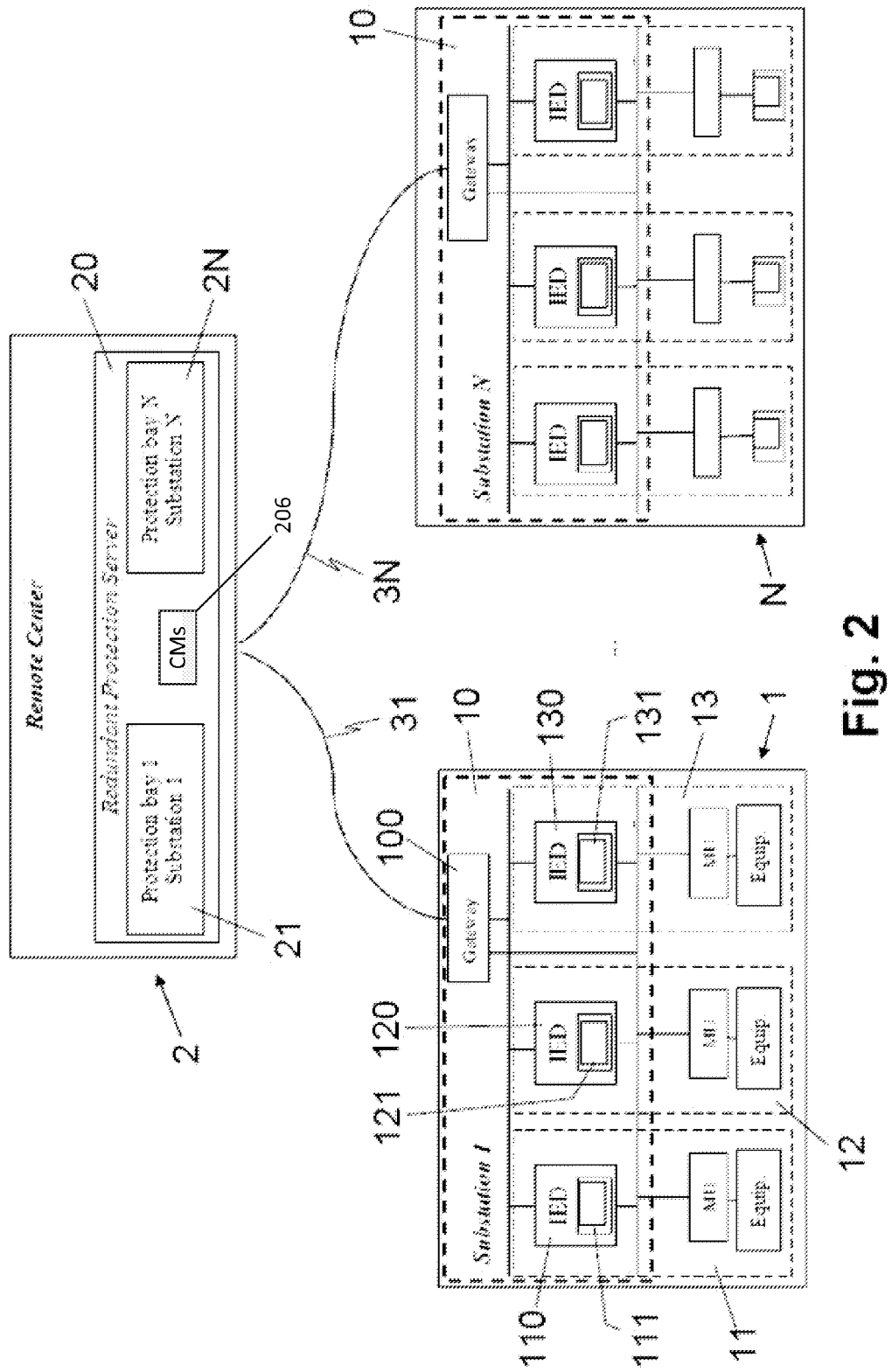
FIG. 2 shows a block diagram illustrating schematically electrical power distribution substations with SA systems connected to a remote center which includes a computerized protection server for the substations, according to an exemplary embodiment of the present disclosure.

In FIG. 2, reference numerals 1, N refer to corresponding electrical power distribution substations, for example, medium voltage substations, which each include a respective SA system 10 according to the present disclosure. Corresponding to the known Substation Automation system 10', the Substation Automation system 10 includes protection modules 110, 120, 130, for example, IEDs, configured to execute protection functions 111, 121, 131 for the respective bays 11, 12, 13 of the substation 1. Accordingly, the protection modules 110, 120, 130 are connected via a process bus 14 and, by way of merging units (MU), to operating equipment and/or measurement equipment, for example, through current and/or voltage transformers (CT/VT). However, contrary to the known solution of FIG. 1, in substations 1, N, a respective communication link 31, 3N is provided in each case between the operating equipment and/or measurement equipment and a computerized redundant protection server 20 which is arranged in a remote center 2. In accordance with an exemplary embodiment, for performance and security reasons, the communication link 31, 3N can be implemented as a dedicated network between the substations 1, N and the protection server 20 or remote center 2, respectively. For example, the remote center 2 is a remote redundancy facility which is located at or part of the Network Control Center (NCC) associated with the electrical power distribution network.

In accordance with an exemplary embodiment, the substations 1, N further include a gateway 100 for external communication with the redundant protection server 20 at the remote center 2. Accordingly, the gateway 100 is connected to the process bus 14 via communication link 16. In an exemplary embodiment of the present disclosure, this communication link 16 is implemented as a redundant intra-substation network from the gateway 100 to the merging units (MU) or the operating equipment and/or measurement equipment, respectively. Consequently, in the latter case, a failing IED (of which the protection functions are redundantly handled by the remote protection server 20) does not block the transmission of the data on which the protection function relies. In accordance with an exemplary embodiment, the external communication between the gateway 100 and the remote protection server 20 is implemented based on an extension of IEC61850, as defined in Draft IEC TR 61850-90-1: Communication networks and systems for power utility automation—Part 90-1: Use of IEC 61850 for the communication between substations. Thus, compared to the known substation 1', the internal architecture of substations 1, N remains essentially the same, but for enabling communication with the redundant protection server 20 at the remote center 2, a communication link 16, 31, 3N is added. One skilled in the art will understand that the gateway 100 in FIG. 2 may be but is not necessarily identical to the known gateway 100' of FIG. 1 which provides protocol conversion between substations and an NCC. In accordance with an exemplary embodiment, the protection server 20 includes a plurality of communication modules (CMs) 206, where each of the communication modules 206 is dedicated to a respective communication link 31, 3N between the protection server 20 and one substation 1, N.

In the exemplary embodiment illustrated in FIG. 2, the process bus 14 is shared across the different bays 11, 12, 13. However, in an alternative exemplary embodiment, where a separate process bus is dedicated to each bay 11, 12, 13, the architecture remains virtually the same, while each one of these process bus segments is connected via a separate communication link to the gateway 100 for communication with the redundant protection server 20.

As illustrated schematically in FIG. 2, the protection server 20 includes several protection modules 21, 2N which are assigned to specific substations 1, N. To prevent a faulty function from having a negative impact on the entire redundant system, each redundant protection function, or at least the protection functions belonging to different substations 1, N, are isolated in a protection module 21, 2N. In accordance with an exemplary embodiment, a separate protection module 21, 2N is assigned to each protection bay 11, 12, 13 of the respective substation 1, N. The redundant protection server 20 includes one or more computers including one or more processors for handling the (redundant) protection functions of several substations 1, N. In accordance with an exemplary embodiment, the processor(s) of the respective protection modules 21, 2N are configured to execute a software program (e.g., computer-readable instructions) tangibly recorded on a non-transitory computer-readable recording medium (e.g., a non-volatile memory) and can therefore be implemented as programmed software modules. Accordingly, the respective protection modules 21, 2N are configured to execute (redundant) protection functions for assigned protection bays 11, 12, 13, in case of a failure of the respective protection module 110, 120, 130 or IED, at the substation 1, N, respectively.

Thus, the redundant protection functions run on the remote protection server 20 and receive the relevant data for computing and executing the protection functions from the extended process bus 14, for example, via the communication link 16, gateway 100 and communication link 31, 3N. Accordingly, network messages including process values measured by measurement equipment associated with the bays 11, 12, 13 are transmitted via the gateway 100 to the respective redundant protection module 21, 2N of the protection server 20. In the case of a detected failure of a protection module 110, 120, 130 (e.g., IED), respectively, network messages including redundancy protection commands are transmitted, for respective execution, from the respective redundant protection module 21, 2N of the protection server 20 to operating equipment associated with the corresponding bays 11, 12, 13.

In accordance with an exemplary embodiment, the protection functions which are associated with the same substation 1, N are executed in the same, common virtual environment, whereby a separate network card is provided at the redundant protection server 20 for each substation 1, N, and, therefore, dedicated to each virtual environment.

The transmission delay of sample (process) values from the measurement equipment (e.g., through current and/or voltage transformers CT/VT) to the redundant protection function is set up as short as possible. For example, a delay of a maximum of three milliseconds is allowed, but in the case of a redundant function this delay can be extended to achieve a delayed redundant protection function. For keeping transmission latency low, optical fiber can be used for the communication link 31, 3N between a substation 1, N and the redundant protection server 20.

In accordance with an exemplary embodiment, not only redundant protection functions are implemented at a server of the remote center 2 but also redundant control functions for each substation 1, N. In another exemplary embodiment, further functions performed in the substations 1, N, for example, event logging, are duplicated remotely in a server of the remote center 2.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A Substation Automation (SA) system comprising:
at least one protection module configured to perform protection functions for a bay of a substation of an electric power system,
wherein the at least one protection module is connected via a process bus to measurement equipment and operating equipment for primary switchgear associated with the bay,
wherein the SA system is configured to transmit, from the process bus to a remote redundancy facility, process values measured by the measurement equipment
wherein the SA system is configured to receive, from the remote redundancy facility, redundancy protection commands directed to the operating equipment, and to forward, via the process bus, the received protection commands to the operating equipment,
wherein the remote redundancy facility comprises a protection server for a plurality of SA systems, each of the plurality of SA systems being configured to respectively perform protection functions for corresponding bays of a substation of an electric power distribution system,
wherein the remote redundancy facility is remote from the SA systems, and
wherein the protection server is configured to run redundant protection functions and to transmit, to the plurality of SA systems, redundancy protection commands to be executed by the respective SA systems for the corresponding bays, respectively.

2. The SA system of claim 1, wherein:
the protection server is configured to receive, from at least one of the SA systems, network messages including process values measured by measurement equipment associated with a corresponding one of the bays; and
the protection server is configured to transmit to the at least one of the SA systems network messages including protection commands directed to operating equipment associated with the corresponding one of the bays.

3. The SA system of claim 1, wherein:
the protection server comprises a plurality of protection modules; and
each of the protection modules is respectively associated with at least one protection function of a specific bay of a substation, and is configured to receive process values measured by measurement equipment respectively associated with that specific bay, and to transmit protection commands to operating equipment respectively associated with that specific bay.

4. The SA system of claim 1, wherein the protection server comprises a plurality of communication modules, each of the communication modules being dedicated to a respective communication link between the protection server and one substation.

5. The SA system of claim 1, wherein the remote redundancy facility is comprised in a Network Control Center of the electric power distribution system.

6. The SA system of claim 1, comprising:
a gateway connected to the process bus,
wherein the gateway is configured to:
communicate with the remote redundancy facility;
forward to the remote redundancy facility network messages including the process values from the measurement equipment; and
forward to the operating equipment protection commands included in network messages received from the remote redundancy facility.

7. The SA system of claim 6, wherein the at least one protection module is an Intelligent Electronic Device configured to communicate with at least one of the measurement equipment and operating equipment via the process bus, and
wherein the Intelligent Electronic Device is connected to the gateway via a substation communication network.

8. The SA system of claim 6, wherein the gateway is connected to at least one of the measurement equipment and the operating equipment via a redundant substation communication network.

9. The SA system of claim 1, wherein the substation is a medium-voltage substation.

\* \* \* \* \*